116,579

UNITED STATES PATENT OFFICE.

MOSES G. FARMER, OF SALEM, MASSACHUSETTS.

IMPROVEMENT IN NICKEL PLATINGS.

Specification forming part of Letters Patent No. 116,579, dated July 4, 1871.

*To all whom it may concern:*

Be it known that I, MOSES G. FARMER, of Salem, in the State of Massachusetts, have invented a new and useful Process for Preparing the Double Sulphate of Nickel and Ammonia to be used for the electro-deposition of nickel.

It has been found that this double salt of nickel and ammonia can be used with great advantage in the electro-deposition of nickel, but that it is necessary to prepare it with care in order to secure its freedom from substances which exert an injurious influence upon the process of deposition.

I have discovered that the compound may be successfully produced by the battery process, so called. To do this I add sulphate of ammonia to water to somewhere near the point of saturation; but the proportions may be varied very greatly at the will of the operator. Into this solution, contained in a proper vessel, I place, for an anode, a plate of nickel which is connected to the positive pole of an electric battery. The battery may have an intensity of about three Smee cells, or, in British units, about two volts, but the intensity may be varied with wide limits. For a cathode I use a piece of copper, connected with the zinc pole of the battery, and I prefer to place this cathode within a porous cup placed in the solution and filled with it. The current, then passing through the solution, causes a portion of the sulphuric acid of the sulphate of ammonia to combine with the nickel, liberating ammonia, and at the same time forming, with an equivalent of sulphate of ammonia, the double sulphate of nickel and ammonia. The process is carried on at ordinary temperatures, and should not be continued so long that no free sulphate of ammonia shall remain in the solution. If carried on beyond that point the sulphate of nickel is formed at the expense of the double sulphate of nickel and ammonia.

From the solution thus formed nickel may be deposited directly by placing the articles, upon which the nickel is to be deposited, in the solution and connecting them with the zinc pole of the battery, first removing the porous cup with its contents, if one has been employed. The density of the solution from which reguline nickel may be obtained may vary within pretty wide limits, depending upon the temperature at which the solution is used and the density of the current employed. If the porous cup is not used, as before suggested, a portion of the ammonia liberated will be retained in solution, rendering it alkaline. This condition is considered unfavorable to the deposition of nickel from the solution, and I, therefore, neutralize it by adding just enough sulphuric acid to enter into combination with the free ammonia present and form sulphate of ammonia, the presence of which does not interfere with the electro-deposition of nickel. When the porous cup is used it prevents the liberated ammonia from being diffused through the double salt.

If it is desired to obtain the double salt in the form of crystals, this may be done by lowering the temperature of the solution. The crystals will then be precipitated and may be removed from the mother liquor. An excellent solution is obtained by redissolving such crystals.

What I claim as my invention is—

The formation of the double sulphate of nickel and ammonia in a solution of sulphate of ammonia by the agency of the electric current, substantially as herein described.

MOSES G. FARMER.

Witnesses:
 CHAUNCEY SMITH,
 WILLIAM W. SWAN.